US012652563B2

(12) United States Patent
Thomas et al.

(10) Patent No.: US 12,652,563 B2
(45) Date of Patent: Jun. 9, 2026

(54) DETERMINING A PARAMETER CHARACTERISTIC OF A STATE OF A USER EQUIPMENT VIA AUTONOMOUS SCALING OF INPUT DATA RESOLUTION AND AGGREGATION

(71) Applicant: VIAVI Solutions Inc., Chandler, AZ (US)

(72) Inventors: Howard John Thomas, Stonehouse (GB); Dave Padfield, Marlborough (GB); Christopher Michael Murphy, Bath (GB); Frank Mamani, Estado de Mexico (MX); Robert Clark, Wiltshire (GB)

(73) Assignee: VIAVI Solutions Inc., Chandler, AZ (US)

( * ) Notice: Subject to any disclaimer, the term of this patent is extended or adjusted under 35 U.S.C. 154(b) by 437 days.

(21) Appl. No.: 17/757,322

(22) PCT Filed: Jun. 17, 2021

(86) PCT No.: PCT/US2021/070721
§ 371 (c)(1),
(2) Date: Jun. 14, 2022

(87) PCT Pub. No.: WO2021/258110
PCT Pub. Date: Dec. 23, 2021

(65) Prior Publication Data
US 2022/0386159 A1      Dec. 1, 2022

Related U.S. Application Data

(60) Provisional application No. 63/041,238, filed on Jun. 19, 2020.

(51) Int. Cl.
H04W 24/10        (2009.01)
H04W 24/04        (2009.01)
(Continued)

(52) U.S. Cl.
CPC ........... H04W 24/10 (2013.01); H04W 24/04 (2013.01); H04W 72/1215 (2013.01); H04W 88/06 (2013.01)

(58) Field of Classification Search
CPC . H04W 24/10; H04W 24/04; H04W 72/1215; H04W 88/06; H04L 41/14; H04L 43/02; H04L 41/0631; H04L 41/0681
(Continued)

(56) References Cited

U.S. PATENT DOCUMENTS 10,178,569 B1 *  1/2019  Colwell .................. H04L 43/08
10,778,755 B1 *  9/2020  Campbell ............... H04L 47/20
(Continued)

FOREIGN PATENT DOCUMENTS

WO      WO-02058325 A2 *  7/2002  ............. H04L 12/14

OTHER PUBLICATIONS

Dhebeha, M.J., et al., "Mechanism of context-aware and adaptive data collection, aggregation and analysis", 2019 IEEE International Conference on Advanced Networks and Telecommunications Systems, Dec. 16, 2019, pp. 1-6, XP033780819, DOI: 10.1109/ ANTS47819.2019.9118049.
(Continued)

*Primary Examiner* — Kwang B Yao
*Assistant Examiner* — Bradley D Lytle, Jr.
(74) *Attorney, Agent, or Firm* — Harrity & Harrity, LLP

(57) ABSTRACT

A device may determine a first resolution and aggregation for data collection from a network and may receive first PM data associated with the network, at the first resolution and aggregation. The device may calculate, based on the first PM data, a first parameter characteristic of a UE and may determine a trigger based on the first parameter characteristic and based on one or more of a root cause analysis, an application input, or a KPI. The device may identify a
(Continued)

100 ➘ portion of the network that is associated with the trigger based on the first PM data and may determine a second resolution and aggregation for data collection from the portion of the network. The device may receive second PM data associated with the portion of the network, at the second resolution and aggregation and may calculate a second parameter characteristic of the UE based on the second PM data.

20 Claims, 10 Drawing Sheets

(51) Int. Cl.
H04W 72/12          (2023.01)
H04W 88/06          (2009.01)

(58) Field of Classification Search
USPC ...... 370/329, 252, 331, 332; 455/450, 67.11
See application file for complete search history.

(56)                    References Cited

U.S. PATENT DOCUMENTS

| | | | | |
|---|---|---|---|---|
| 11,012,873 | B1 * | 5/2021 | Mondragon | ........... G06N 3/044 |
| 2015/0195174 | A1 | 7/2015 | Kogami | |
| 2018/0159746 | A1 * | 6/2018 | Li | ....................... H04L 41/5016 |
| 2018/0316764 | A1 * | 11/2018 | Ferreira Gomes | ....... G07C 5/02 |
| 2019/0364492 | A1 | 11/2019 | Azizi et al. | |
| 2020/0053524 | A1 * | 2/2020 | Novlan | ................. H04W 84/20 |
| 2020/0077411 | A1 * | 3/2020 | Raghavan | ............ H04B 7/0617 |
| 2020/0304381 | A1 | 9/2020 | Wang et al. | |
| 2021/0083914 | A1 * | 3/2021 | Cao | ........................ H04L 5/0053 |
| 2021/0219110 | A1 * | 7/2021 | Kousaridas | ............. H04W 4/70 |

OTHER PUBLICATIONS

Extended European Search Report for European Application No. EP21826221, dated May 24, 2024, 5 pages.
International Search Report and Written Opinion—PCT/US2021/070721—ISA/US—Sep. 16, 2021.

* cited by examiner

105
Determine a first resolution and aggregation for data collection

Monitoring system

110
Provide, to a network, a first indicator identifying the first resolution and aggregation for data collection

115
Receive, from the network, first performance management (PM) data associated with the network, based on the first indicator RANs Core network UEs

100

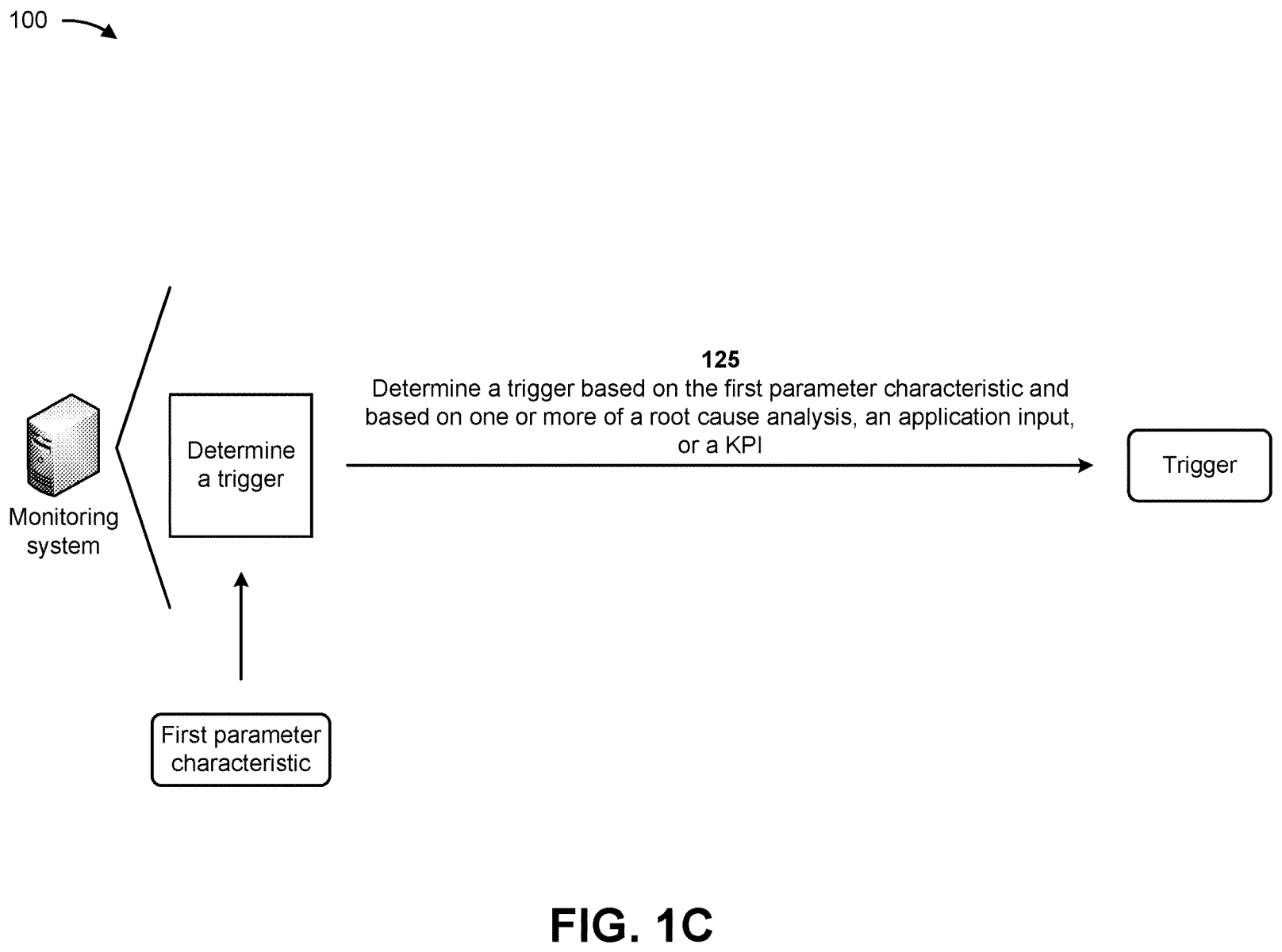

100

Trigger

125
Determine a trigger based on the first parameter characteristic and based on one or more of a root cause analysis, an application input, or a KPI Determine a trigger Monitoring system First parameter characteristic

FIG. 1C

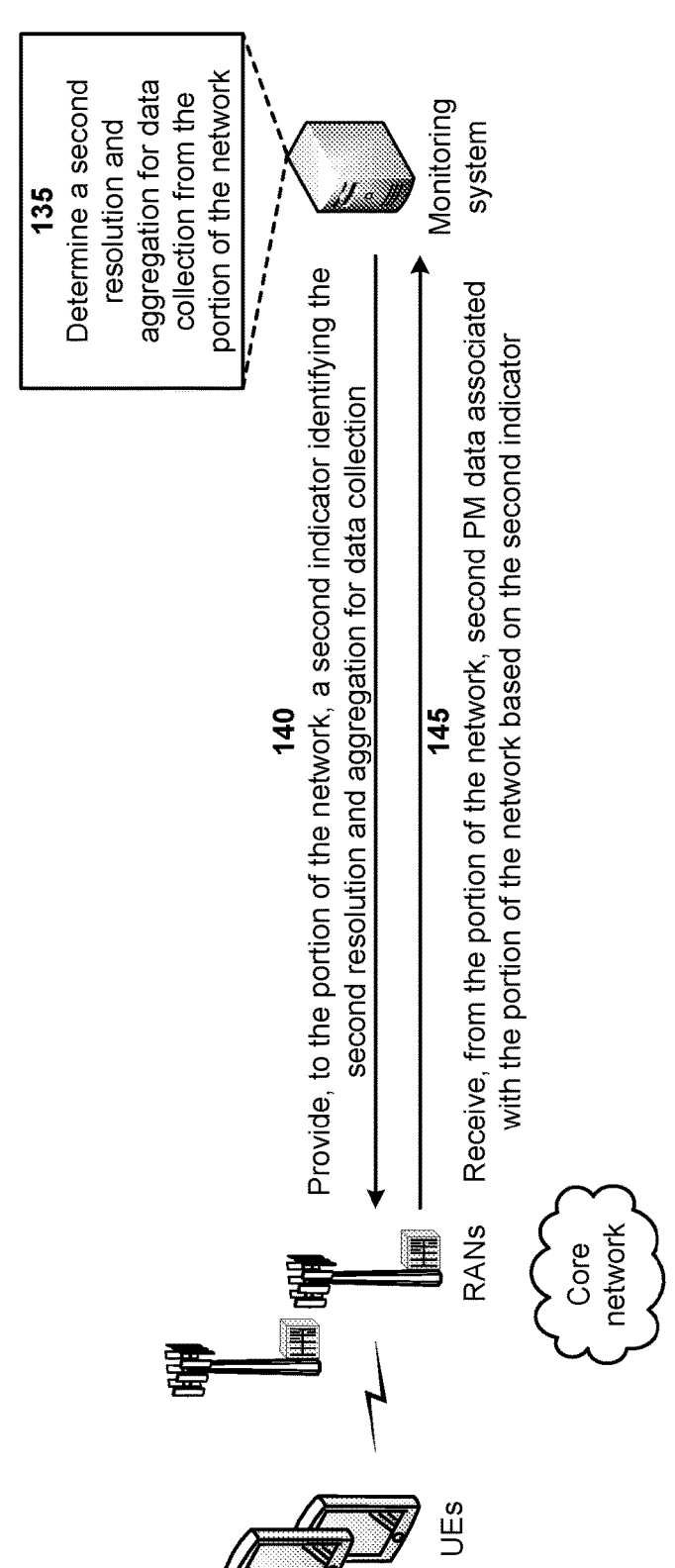

135
Determine a second resolution and aggregation for data collection from the portion of the network Monitoring system

140
Provide, to the portion of the network, a second indicator identifying the second resolution and aggregation for data collection

145
Receive, from the portion of the network, second PM data associated with the portion of the network based on the second indicator RANs Core network UEs

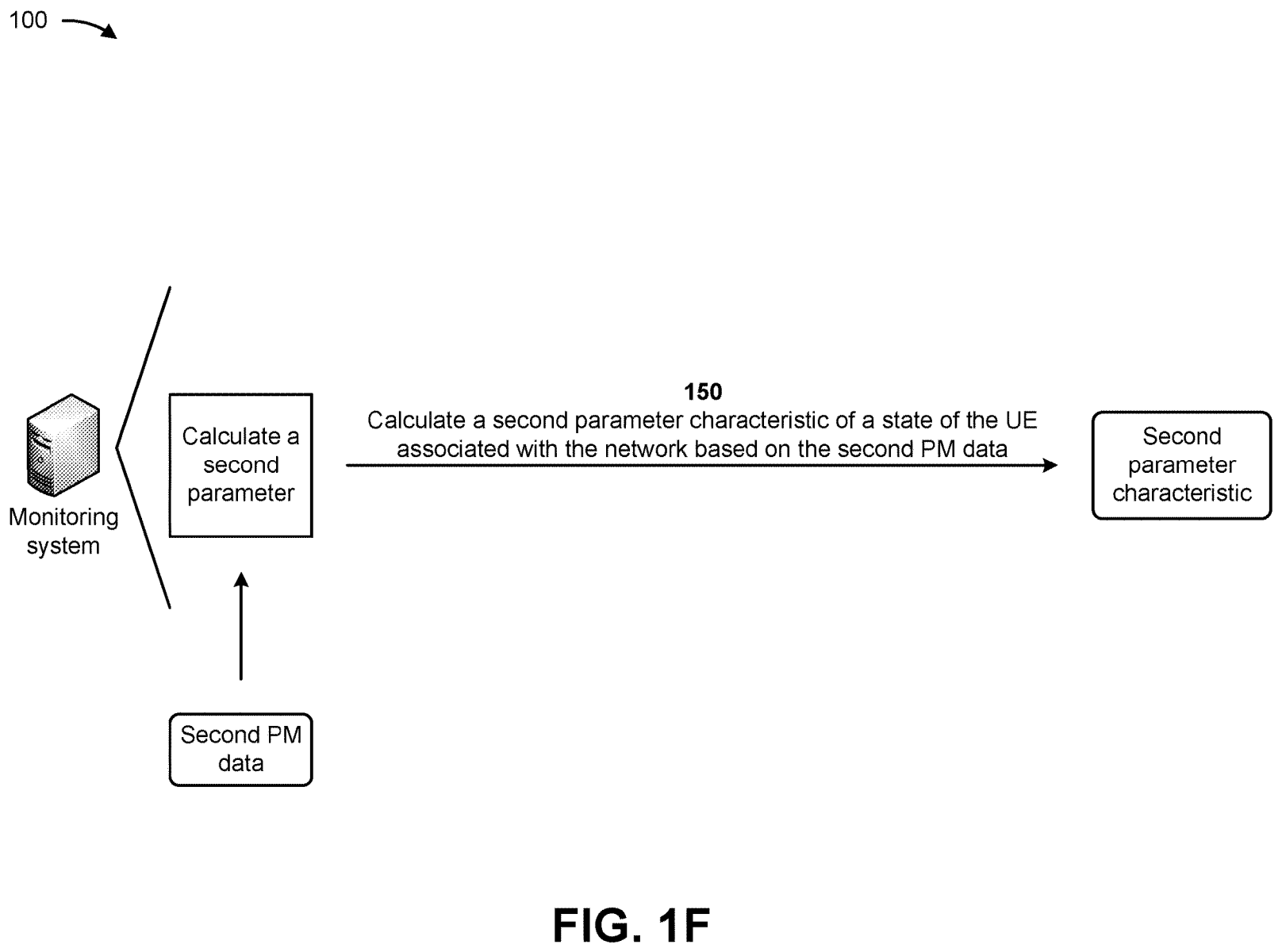

Calculate a second parameter characteristic of a state of the UE associated with the network based on the second PM data Second parameter characteristic Calculate a second parameter Second PM data Monitoring system

FIG. 1F

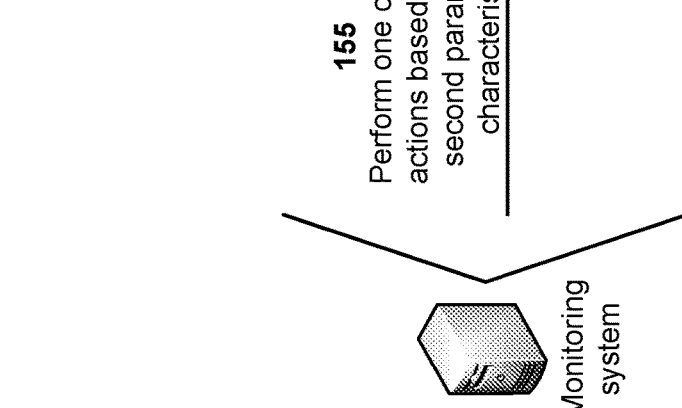

Cause a higher resolution faster available data feed to be provided by the portion of the network Generate and provide for display a two-dimensional or a three-dimensional map of the second PM data Cause a parameter of a RAN, of the portion of the network, to be modified based on the second PM data Cause, in the portion of the network, a change in a location of processing the second PM data Cause an emergency service to be provided via switching from unicast to multicast operation in the portion of the network Cause an emergency service to be provided via dispatching an autonomous vehicle with network coverage to the portion of the network

155
Perform one or more actions based on the second parameter characteristic Monitoring system

DETERMINING A PARAMETER CHARACTERISTIC OF A STATE OF A USER EQUIPMENT VIA AUTONOMOUS SCALING OF INPUT DATA RESOLUTION AND AGGREGATION

CROSS-REFERENCE TO RELATED APPLICATIONS

This Patent Application is a 371 national stage of PCT Application No. PCT/US2021/070721 filed on Jun. 17, 2021, entitled "DETERMINING A PARAMETER CHAR-ACTERISTIC OF A STATE OF A USER EQUIPMENT VIA AUTONOMOUS SCALING OF INPUT DATA RESO-LUTION AND AGGREGATION," which claims priority to U.S. Provisional Patent Application No. 63/041,238, filed on Jun. 19, 2020, and entitled "GEOLOCATION WITH AUTONOMOUS SCALING OF INPUT DATA RESOLU-TION AND AGGREGATION," which are hereby expressly incorporated by reference herein.

BACKGROUND

Legacy systems provide a semi-static configuration of performance management data that is collected from a network, such as a telecommunications network. This semi-static configuration defines a granularity in time and a geographic resolution with which data is reported, and defines an amount of aggregation with which reports are sent. For example, a report of timing advances for an active subscriber in a telecommunications network may be aggre-gated into reports sent periodically, where each report con-tains an average timing advance for each ten seconds within a reporting period. Other data collected may relate to signal strength and quality, call events (e.g., call set-up and call tear-down), establishment of radio access bearers, han-dovers, allocation of additional secondary cells, and/or the like.

SUMMARY

In some implementations, a method may include deter-mining a first resolution and aggregation for data collection from a network, wherein the network includes one or more radio access networks (RANs) and a core network. The method may include providing, to the network, a first indicator identifying the first resolution and aggregation for data collection from the network and receiving, from the network, first performance management data associated with the network, based on the first indicator. The method may include calculating, based on the first performance manage-ment data, a first parameter characteristic of a state of a user equipment associated with the network and determining a trigger based on the first parameter characteristic and based on one or more of a root cause analysis, an application input associated with the user equipment, or a key performance indicator. The method may include identifying a portion of the network that is associated with the trigger based on the first performance management data and determining a sec-ond resolution and aggregation for data collection from the portion of the network. The method may include providing, to the portion of the network, a second indicator identifying the second resolution and aggregation for data collection from the portion of the network and receiving, from the portion of the network, second performance management data associated with the portion of the network, based on the second indicator. The method may include calculating a second parameter characteristic of a state of the user equip-ment associated with the network based on the second performance management data and performing one or more actions based on the second parameter characteristic.

In some implementations, a device includes one or more memories and one or more processors to determine a first resolution and aggregation for data collection from a net-work, wherein the network includes one or more RANs and a core network. The one or more processors may provide, to the network, a first indicator identifying the first resolution and aggregation for data collection from the network and may receive, from the network, first performance manage-ment data associated with the network, based on the first indicator, wherein the first performance management data is received at the first resolution and aggregation from the network. The one or more processors may calculate, based on the first performance management data, a first parameter characteristic of a state of a user equipment associated with the network and may determine a trigger based on the first parameter characteristic and based on one or more of a root cause analysis, an application input associated with the user equipment, or a key performance indicator. The one or more processors may identify a portion of the network that is associated with the trigger based on the first performance management data and may determine a second resolution and aggregation for data collection from the portion of the network. The one or more processors may provide, to the portion of the network, a second indicator identifying the second resolution and aggregation for data collection from the portion of the network and may receive, from the portion of the network, second performance management data asso-ciated with the portion of the network, based on the second indicator, wherein the second performance management data is received at the second resolution and aggregation from the portion of the network. The one or more processors may calculate a second parameter characteristic of a state of the user equipment associated with the network based on the second performance management data and may perform one or more actions based on the second parameter characteris-tic.

In some implementations, a non-transitory computer-readable medium may store a set of instructions that includes one or more instructions that, when executed by one or more processors of a device, cause the device to determine a first resolution and aggregation for data collec-tion from a network, wherein the network includes one or more RANs and a core network. The one or more instruc-tions may cause the device to receive, from the network, first performance management data associated with the network, at the first resolution and aggregation and calculate, based on the first performance management data, a first parameter characteristic of a state of a user equipment associated with the network. The one or more instructions may cause the device to determine a trigger based on the first parameter characteristic and based on one or more of a root cause analysis, an application input associated with the user equip-ment, or a key performance indicator and identify a portion of the network that is associated with the trigger based on the first performance management data. The one or more instructions may cause the device to determine a second resolution and aggregation for data collection from the portion of the network and receive, from the portion of the network, second performance management data associated with the portion of the network, at the second resolution and aggregation. The one or more instructions may cause the device to calculate a second parameter characteristic of a state of the user equipment associated with the network based on the second performance management data and perform one or more actions based on the second parameter characteristic.

BRIEF DESCRIPTION OF THE DRAWINGS

FIGS. 1A-1G are diagrams of an example associated with determining a parameter characteristic of a state of a user equipment (UE) via autonomous scaling of input data resolution and aggregation.

DETAILED DESCRIPTION

Figure 1A:
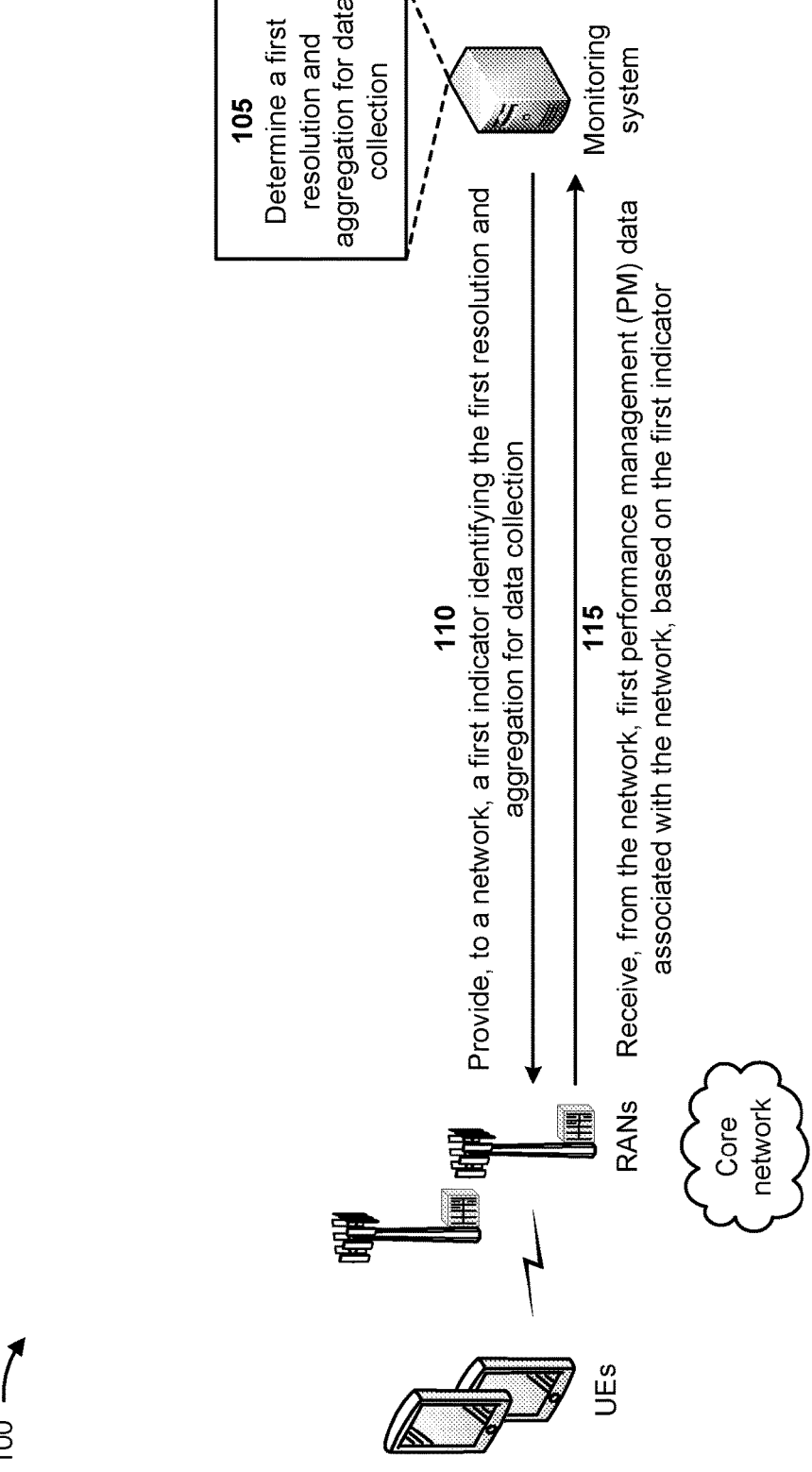

The following detailed description of example implementations refers to the accompanying drawings. The same reference numbers in different drawings may identify the same or similar elements.

Since a configuration of a legacy system is semi-static, a volume of information collected, which is determined by granularity and aggregation, is not responsive to immediate requirements of the network. Consequently, whether a task at hand is to optimize the network by enabling a prescriptive or preemptive determination of optimized parameter settings, to provide a root cause analysis of network faults, or to provide geolocation enrichment information to a subscriber application, a uniform resolution of input data will be collected and processed. Reconfiguring current legacy systems in response to triggers, that require a finer resolution of data collection, is difficult because trigger information is generally available with too great a latency (e.g., due to a large geography, a large quantity of network elements, a large network slice, and/or the like) and because the configuration cannot be controlled finely enough to surgically target a desired data collection rate (e.g., with respect to a specific portion of the network). As a result, a trade-off between the volume of data collected and processed has to be made, as a compromise between performance of a task at hand and limitations of available storage, processing, and transport requirements.

Thus, current legacy systems waste computing resources (e.g., processing resources, memory resources, communication resources, and/or the like), networking resources, and other resources associated with utilizing a sub-optimal network, handling connectivity issues, utilizing suboptimal applications, handling user complaints associated with the user experience, and/or the like.

Some implementations described herein provide a monitoring system for autonomously scaling resolution and aggregation levels of data used to determine an action associated with a parameter characteristic of a state of a UE, such as a geolocation or geolocation prediction of the UE, responsive to time varying requirements of a network, a subscriber, an application, a network slice, a geographical location, and/or the like. The action may include implementing data filtering, triggering a data collection, changing a format of one or more reports, determining an optimization, implementing an optimization, performing a network assurance option, changing a priority of a data collection, changing a latency of a data collection, changing a granularity of a data collection, providing a data feed to one or more different monitoring or processing entities, and/or the like.

For example, the monitoring system may set a first resolution and aggregation for data collection, and may receive data (e.g., network data, key performance indicators (KPIs), application data, and/or the like) based on the first resolution and aggregation. The monitoring system may determine a parameter characteristic of a state of a UE based on the data and may determine a trigger based on a root cause analysis, based on application data, based on the parameter characteristic and the KPIs, and/or the like. The monitoring system may identify a portion of the network associated with the trigger and may set a second resolution and aggregation for data collection for the portion of the network. The monitoring system may perform an action based on the second resolution and aggregation. For example, the monitoring system may provide a greater resolution and faster available data feed, may display network portion performance on a map (e.g., a two-dimensional map or a three-dimensional map), may change a RAN parameter, and/or the like. In some implementations, trigger conditions for the second data collection may overlap so that multiple second data collections may occur simultaneously with overlapping scope (e.g., overlapping network devices, network slices, UEs, applications, and/or the like).

In this way, the monitoring system autonomously scales resolution and aggregation levels of data collected from a network and utilized to determine an action. For example, the monitoring system may perform an action that optimizes network performance, a user experience, an application performance, and/or the like, which conserves computing resources, networking resources, and/or the like that would otherwise have been consumed utilizing a sub-optimal network, handling connectivity issues, utilizing sub-optimal applications, handling user complaints associated with the user experience, and/or the like.

FIGS. 1A-1G are diagrams of an example 100 associated with determining a parameter characteristic of a state of a UE via autonomous scaling of input data resolution and aggregation. As shown in FIGS. 1A-1G, example 100 includes UEs associated with radio access networks (RANs), a core network, and a monitoring system. The RANs and the core network together may form what is referred to as a network. Further details of the UEs, the RANs, the core network, and the monitoring system are provided elsewhere herein.

As shown in FIG. 1A, and by reference number 105, the monitoring system may determine a first resolution and aggregation for data collection from the network. For example, the monitoring system may determine that data collection from the network be made with a first granularity in time and of geographic scope, with a first collection aggregation in time or of geographic scope, and/or the like. In some implementations, the first resolution and aggregation for data collection may include collecting data every minute (e.g., a first aggregation time) with measurements that are provided at one second resolution (e.g., a first resolution) within the data collected every minute. In some implementations, the first resolution and aggregation for data collection may include collecting data at a different first aggregation time with measurements that are provided at a different first resolution.

As further shown in FIG. 1A, and by reference number 110, the monitoring system may provide, to the network, a first indicator identifying the first resolution and aggregation for data collection. For example, the monitoring system may generate the first indicator identifying the first resolution and aggregation for data collection based on determining the first resolution and aggregation for data collection. The monitoring system may provide the first indicator to the RANs of the network, one or more network devices of the core network, and/or the like. The first indicator may cause the RANs, the one or more network devices of the core network, and/or the like to provide performance management (PM) data to the monitoring system at the first resolution and aggregation.

As further shown in FIG. 1A, and by reference number 115, the monitoring system may receive, from the network, first PM data associated with the network, based on the first indicator. For example, the first indicator may cause the monitoring system to receive the first PM data from the network at the first resolution and aggregation. In some implementations, the first PM data may include timing data associated with one or more of propagation delay of network signaling, timing advance (TA) aggregated in groups of TA steps for network signaling, instantaneous time offset of uplink signaling of the network, additional TA network signaling for different RANs, and/or the like.

In some implementations, the first PM data may include beam data associated with one or more of vertical or horizontal angle of arrival by a beam associated with the RANs, time to acquire the angle of arrival, uncertainty in the angle of arrival, rate of change or quantities of change related to attached RANs, beams of the RANs, best beams of the RANs, types of beam forming by the RANs, beam failure recoveries by the RANs, beam characteristics on multiple frequencies of operation, probability of line of sight propagation, and/or the like.

In some implementations, the first PM data may include UE identity data that enables data related to a same UE but connected to different RANs or beams to be correlated to enable a unified analysis and determination of a location of the UE, data that enables generation of analyses related to UE identifiers, such as subscribers of key accounts or customers who call to complain about adverse network events, and/or the like. The UE identity data may be available for a particular period of time. For example, an international mobile subscriber identity (IMSI), while allowing unique identification of a UE, may present a security issue or an inappropriate use of personal identification information. Consequently, the UE identity data may be utilized for correlation purposes or for appropriate KPI generation.

In some implementations, the first PM data may include data collected from a service management and orchestration (SMO) network device, where data is available over an operations and maintenance (O1) streaming interface according to an open RAN (O-RAN) architecture.

In some implementations, the first PM data may include data identifying one or more of an angle of arrival of a RAN signal in azimuth or elevation at the UE, a time to determine the angle of arrival or an inability to determine the angle of arrival, a raw time of arrival of the RAN signal, a timing advance associated with the UE, a quantity of beam changes by the UE, a quantity of beam failure recoveries by the UE, and/or the like.

In some implementations, the first PM data may include environmental data identifying an elevation or an atmospheric pressure associated with the UE, a temperature associated with the UE, sounds encountered by the UE, noise levels encountered by the UE, measurements of other radio technologies or magnetic fields proximate to the RANs or the UE, and/or the like.

Figure 1B:
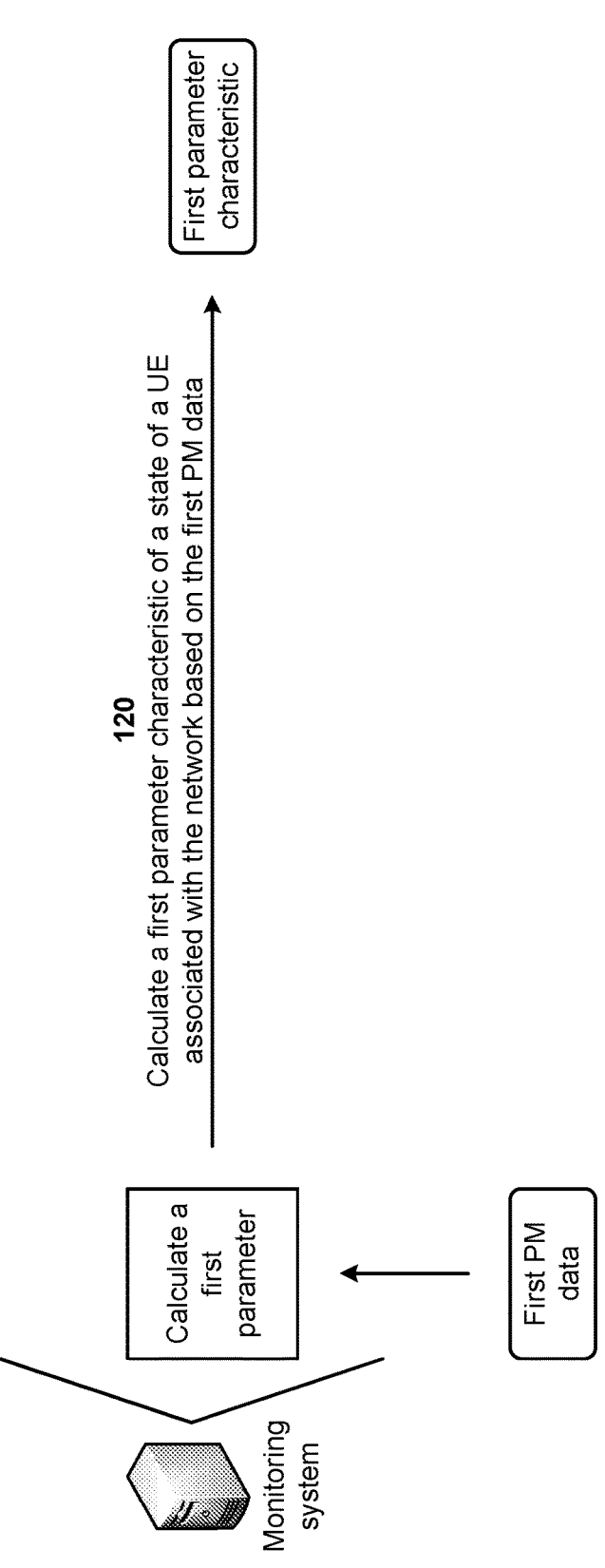

As shown in FIG. 1B, and by reference number 120, the monitoring system may calculate a first parameter characteristic of a state of a UE associated with the network based on the first PM data. For example, the monitoring system may process the first PM data, with a model (e.g., a haversine model), to calculate the first parameter characteristic of the state of the UE associated with the network. In some implementations, the monitoring system may utilize knowledge of geolocations of the RANs and the first PM data to calculate distances between the RANs and the UE. The monitoring system may then utilize the geolocations of the RANs and the distances between the RANs and the UE to calculate the first parameter characteristic (e.g., a geolocation) of the UE. In some implementations, the monitoring system may process the first PM data, with a model that conducts a first parameter characteristic (e.g., geolocation) pass to identify one or more parameter characteristic estimates under consideration. The model may conduct at least one additional parameter characteristic pass to refine one or more parameter characteristic estimates under consideration and may determine an approximate parameter characteristic (e.g., the first parameter characteristic) of the UE within an estimated coverage area of a network based on at least the first parameter characteristic pass and the at least one additional parameter characteristic pass.

As shown in FIG. 1C, and by reference number 125, the monitoring system may determine a trigger based on the first parameter characteristic and based on one or more of a root cause analysis, an application input associated with the UE, or a KPI. For example, the monitoring system may utilize a root cause analysis to identify problems associated with the first parameter characteristic, such as problems associated with an accuracy of the first parameter characteristic, problems associated with the first PM data utilized to calculate to the first parameter characteristic, and/or the like. Accordingly, the monitoring system may determine that data collection associated with the UE needs to be increased in order to determine solutions to the problems associated with the first parameter characteristic. The monitoring system may determine the trigger in order to increase the data collection associated with the UE.

In some implementations, the monitoring system may utilize an application input (e.g., a navigation software application) associated with the UE to identify problems associated with the first parameter characteristic, such as the problems described above. Accordingly, the monitoring system may determine that data collection associated with the UE needs to be increased in order to determine solutions to the problems associated with the first parameter characteristic. The monitoring system may determine the trigger in order to increase the data collection associated with the UE.

The KPI may include a KPI identifying one or more of an error rate associated with a RAN serving the UE, a throughput associated with a RAN serving the UE, a quality of service (QoS) associated with a RAN serving the UE, a quality of experience (QoE) associated with a RAN serving the UE, a mean opinion score associated with a RAN serving the UE, a quantity of power utilized by the UE, whether the UE reached a maximum power, a connection drop associated with the UE, a latency associated with a RAN serving the UE, jitter associated with a RAN serving the UE, a cell load associated with a RAN serving the UE, a velocity associated with the UE, and/or the like. In some implementations, the monitoring system may utilize such KPIs to identify problems associated with the first parameter characteristic, such as the problems described above. Accordingly, the monitoring system may determine that data collection associated with the UE needs to be increased in order to determine solutions to the problems associated with the first parameter characteristic. The monitoring system may determine the trigger in order to increase the data collection associated with the UE.

In some implementations, the trigger may be limited to a geographic scope of the network, such as a coverage area associated with a RAN, a portion of a RAN, a beam or a portion of a beam of a RAN, a set of geographic network devices, and/or the like. The trigger may include a specific geographic scope independent of the network devices, such as, for example, within a geographic polygon, within specific tiles in a grid of tiles, within a building, at a specific outdoor area, and/or the like. The trigger may be valid for a particular duration of time for the particular geographic area.

Figure 1D:
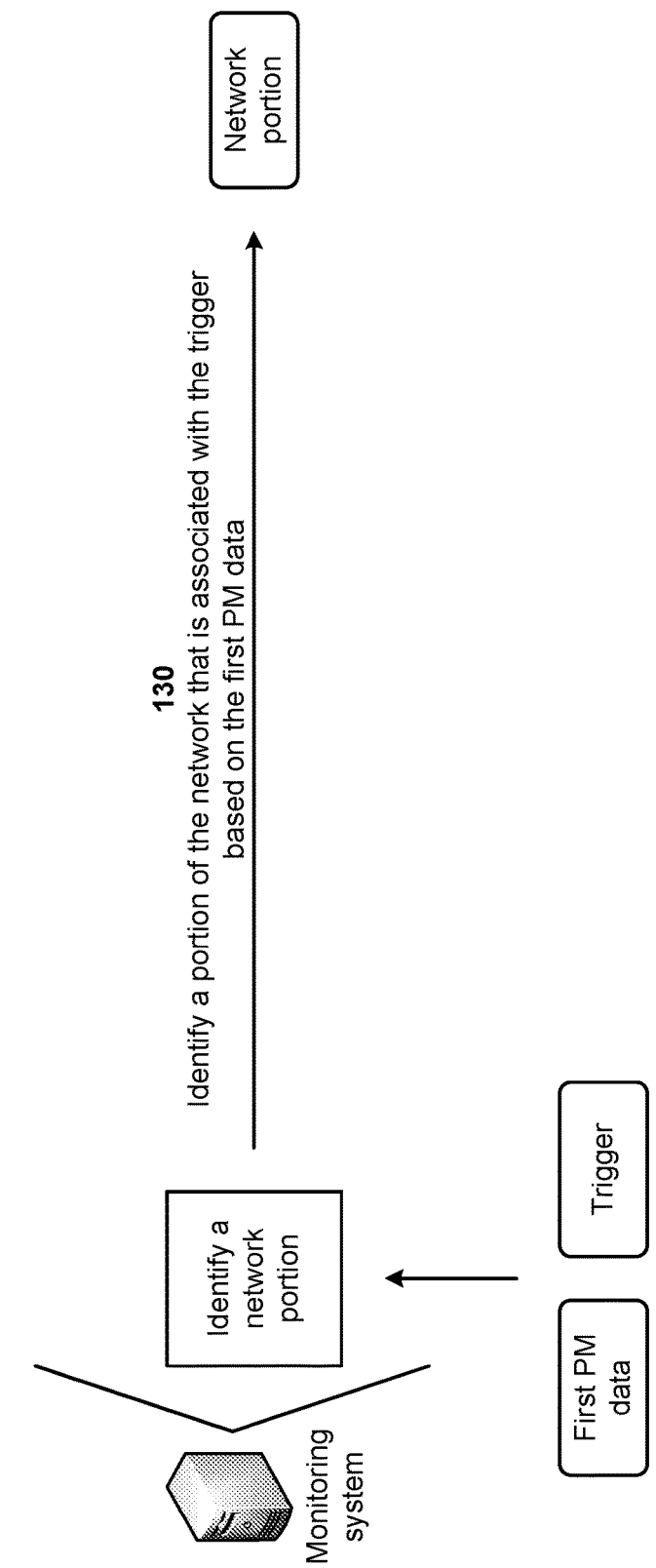

As shown in FIG. 1D, and by reference number 130, the monitoring system may identify a portion of the network that is associated with the trigger based on the first PM data. For example, the monitoring system may determine that one or more of the RANs and/or one or more network devices of the core network are associated with the trigger since the one or more of the RANs and/or the one or more network devices of the core network create the problems associated with the first parameter characteristic. In such an example, the one or more of the RANs and/or the one or more network devices of the core network may define the identified portion of the network. In some implementations, the monitoring system may utilize the first PM data and one or more of the root cause analysis, the application input, or the KPI to identify the portion of the network that is associated with the trigger.

As shown in FIG. 1E, and by reference number 135, the monitoring system may determine a second resolution and aggregation for data collection from the network. For example, the monitoring system may determine that data collection from the portion of the network be made with a second granularity in time and of geographic scope, with a second collection aggregation in time or of geographic scope, and/or the like. In some implementations, the second resolution and aggregation for data collection may include collecting data at a second aggregation time with measurements that are provided at a first resolution within the data collected every minute. In some implementations, the second resolution and aggregation for data collection may include collecting data at a different second aggregation time with measurements that are provided at a different second resolution. In some implementations, the second resolution and aggregation data collection is faster than, and includes a greater resolution than, the first resolution and aggregation data collection.

As further shown in FIG. 1E, and by reference number 140, the monitoring system may provide, to the network, a second indicator identifying the second resolution and aggregation for data collection. For example, the monitoring system may generate the second indicator identifying the second resolution and aggregation for data collection based on determining the second resolution and aggregation for data collection. The monitoring system may provide the second indicator to the portion of the network (e.g., RANs and/or network devices of the core network associated with the portion of the network). The second indicator may cause the portion of the network to provide PM data to the monitoring system at the second resolution and aggregation.

As further shown in FIG. 1E, and by reference number 145, the monitoring system may receive, from the portion of the network, second PM data associated with the portion of the network, based on the second indicator. For example, the second indicator may cause the monitoring system to receive the second PM data from the portion of the network at the second resolution and aggregation. In some implementations, the second PM data may include timing data associated with one or more of propagation delay of network signaling, TA aggregated in groups of TA steps for network signaling, instantaneous time offset of uplink signaling of the network, additional TA network signaling for different RANs, and/or the like.

In some implementations, the second PM data may include beam data associated with one or more of vertical or horizontal angle of arrival by a beam associated with the RANs, time to acquire the angle of arrival, uncertainty in the angle of arrival, rate of change or quantities of change related to attached RANs, beams of the RANs, best beams of the RANs, types of beam forming by the RANs, beam failure recoveries by the RANs, beam characteristics on multiple frequencies of operation, probability of line of sight propagation, and/or the like.

In some implementations, the second PM data may include UE identity data that enables data related to a same UE but connected to different RANs or beams to be correlated to enable a unified analysis and determination of a location of the UE, data that enables generation of analyses related to UE identifiers, such as subscribers of key accounts or customers who call to complain about adverse network events, and/or the like. The UE identity data may be available for a particular period of time. For example, an IMSI, while allowing unique identification of a UE, may present a security issue or an inappropriate use of personal identification information. Consequently, the UE identity data may be utilized for correlation purposes or for appropriate KPI generation.

In some implementations, the second PM data may include data collected, at the second resolution and aggregation, from the SMO network device, where data is available over an O1 streaming interface according to the O-RAN architecture. The second PM data may include data collected from a wireless emergency service protocol (E2) interface (e.g., related to a network slice supporting the wireless emergency service over the E2 interface), data collected from the E2 interface that captures call events for one or more UEs, and/or the like. The second PM data may be received from network devices closer to an edge of the portion of the network with lower latency and without backhauling large quantities of data to a central location.

In some implementations, the second PM data may include data identifying one or more of an angle of arrival of a RAN signal in azimuth or elevation at the UE, a time to determine the angle of arrival or an inability to determine the angle of arrival, a raw time of arrival of the RAN signal, a timing advance associated with the UE, a quantity of beam changes by the UE, a quantity of beam failure recoveries by the UE, and/or the like.

In some implementations, the second PM data may include environmental data identifying an elevation or an atmospheric pressure associated with the UE, a temperature associated with the UE, sounds encountered by the UE, noise levels encountered by the UE, measurements of other radio technologies or magnetic fields proximate to the RANs or the UE, and/or the like.

As shown in FIG. 1F, and by reference number 150, the monitoring system may calculate a second parameter characteristic of a state of the UE associated with the network based on the second PM data. For example, the monitoring system may process the second PM data, with a model (e.g., a haversine model), to calculate the second parameter characteristic of the state of the UE associated with the network. In some implementations, the monitoring system may utilize knowledge of geolocations of the RANs and the second PM data to calculate distances between the RANs and the UE. The monitoring system may then utilize the geolocations of the RANs and the distances between the RANs and the UE to calculate the second parameter characteristic (e.g., the geolocation) of the UE. In some implementations, the monitoring system may process the second PM data, with a model that conducts a second parameter characteristic (e.g., geolocation) pass to identify one or more parameter characteristic estimates under consideration. The model may conduct at least one additional parameter characteristic pass to refine one or more parameter characteristic estimates under consideration and may determine an approximate parameter characteristic (e.g., the second parameter characteristic) of the UE within an estimated coverage area of a network based on at least the second parameter characteristic pass and the at least one additional parameter characteristic pass.

As shown in FIG. 1G, and by reference number 155, the monitoring system may perform one or more actions based on the second parameter characteristic. In some implementations, the one or more actions include the monitoring system causing a higher resolution faster available data feed to be provided by the portion of the network. For example, the portion of the network may provide the second PM data to the monitoring system at the second resolution and aggregation for data collection, which are greater than the first resolution and aggregation for data collection. Receiving the second PM data at a higher data rate may enable the monitoring system to more quickly resolve problems identified in the portion of the network based on the second PM data. In this way, the monitoring system conserves computing resources, networking resources, and/or the like that would otherwise have been consumed utilizing a sub-optimal portion of the network, handling user complaints associated with the user experience, and/or the like.

In some implementations, the one or more actions include the monitoring system generating and providing for display a two-dimensional or a three-dimensional map of the second PM data. For example, the monitoring system may utilize the second PM data to generate a representation (e.g., a map) of the second PM data that may be utilized by a user of the monitoring system to identify problems in the portion of the network. In this way, the monitoring system conserves computing resources, networking resources, and/or the like that would otherwise have been consumed utilizing a sub-optimal portion of the network, handling connectivity issues, handling user complaints associated with the user experience, and/or the like.

In some implementations, the one or more actions include the monitoring system causing a parameter of a RAN, of the portion of the network, to be modified. For example, the monitoring system may instruct the RAN, of the portion of the network, to modify a parameter (e.g., a beam intensity, a beam angle, and/or the like) associated with the RAN. The modified parameter may address one or more problems identified in the portion of the network (e.g., associated with the RAN). In this way, the monitoring system conserves computing resources, networking resources, and/or the like that would otherwise have been consumed utilizing a sub-optimal network, handling connectivity issues, utilizing sub-optimal applications, and/or the like.

In some implementations, the one or more actions include the monitoring system causing, in the portion of the network, a change in a location of processing the second PM data. For example, the monitoring system may cause the second PM data to be provided by and processed by network devices closer to an edge of the portion of the network with lower latency and without backhauling large quantities of data to a central location. Thus, the second PM data may be received by the monitoring system at a higher data rate, which may enable the monitoring system to more quickly resolve problems identified in the portion of the network based on the second PM data. In this way, the monitoring system conserves computing resources, networking resources, and/or the like that would otherwise have been consumed utilizing a sub-optimal portion of the network, handling user complaints associated with the user experience, and/or the like.

In some implementations, the one or more actions include the monitoring system causing an emergency service to be provided via switching from unicast to multicast operation (e.g., or ad-hoc direct device-to-device operation) in the portion of the network. For example, the monitoring system may cause the portion of the network to switch from unicast to multicast operation so that the emergency service may be provided by the portion of the network. The multicast operation may enable the portion of the network to provide the emergency service more quickly than the unicast operation may provide the emergency service. In this way, the monitoring system conserves computing resources, networking resources, and/or the like that would otherwise have been consumed providing insufficient emergency services, handling legal issues associated with providing insufficient emergency services, and/or the like.

In some implementations, the one or more actions include the monitoring system causing an emergency service to be provided via dispatching an autonomous vehicle with network coverage to the portion of the network (e.g., or preempting services operating on other network slices in the portion of the network). For example, if the portion of the network needs additional network coverage for the emergency service, the monitoring system may dispatch the autonomous vehicle (e.g., a drone, a robot, and/or the like) to a location of the portion of the network to provide the additional network coverage. The autonomous vehicle may provide the additional network coverage necessary to provide the emergency service in the portion of the network. In this way, the monitoring system conserves computing resources, networking resources, and/or the like that would otherwise have been consumed providing insufficient emergency services, handling legal issues associated with providing insufficient emergency services, and/or the like.

There are various ways of deriving geolocation estimates of a UE that use one or more measurements provided by the UE or a RAN. In general, these will be measurements of the power at which a transmission of a RAN is received by the UE whose location is being estimated, where this is measured by the UE and reported to the RAN. A geolocation estimate may be improved by using an offset between a time at which a transmission from a RAN is received at a UE and a time at which that UE makes a transmission to the RAN. This offset may be established by the RAN because the RAN keeps track of timing corrections it has instructed the UE to apply, or because the UE reports this offset to the RAN, and/or the like. This offset may be used in many communication systems to help keep transmissions from the UE within a delay window when the transmissions arrive at a serving RAN and thus avoid interference with other transmissions from other UEs using the same spectral resources. A geolocation estimate of a Universal Mobile Telecommunications System (UMTS) UE may be improved by using a magnitude by which reception of a start of a transmission frame structure from one RAN by the UE is offset from reception of a start of a transmission frame structure from another RAN by the same UE.

In communication systems where an air interface relies on timing alignment of receive and transmit frames to facilitate efficient communication (e.g., LTE, NR, and/or the like) it may be necessary to operate a timing advance mechanism to manage a timing adjustment of transmissions from the UE as the UE moves through and between RANs so that the transmissions are received by a RAN within an acceptable interval. The value of the timing advance may be used to assist in estimation of a geolocation of the UE in combination with other techniques.

The LTE and NR communication systems allow for separate timing advance to be maintained for multiple RANs. To support this, the UE may perform measurements of a time that transmissions from RANs in a first timing advance group are offset from a time that transmissions from RANs in a second timing advance group are received by the UE. These measurements may be reported by the UE to the network and thus may be available for use in a geolocation estimation process that is independent of the UE. The measurements reported may include Spectrum Sharing Test and Demonstration (SSTD) in the context of LTE and System Frame Number and Frame Timing Difference (SFTD) in the context of NR. These independent timing offset delay measurements may be utilized to enhance geolocation estimates.

A geolocation estimation process may use measurements where such measurements are from more than one timing advance group and may be associated with RANs that may be from at least one frequency band or bandwidth part. Such RANs or bandwidth part may operate at different subcarrier spacings with consequently different timing advance resolution. A variety of timing advance resolutions in the measurements for a UE may support more accurate geolocation estimates for the UE. The RANs may operate in different frequency bands with different radio propagation environments or may include different antenna configurations. In this case, the measurements may form independent estimates of propagation delay and thus may increase an error resilience of a geolocation estimation process.

In some implementations, the monitoring system may utilize the capability of 4G and 5G systems for establishing simultaneous connections to a set of multiple RANs, where each RAN in the set may be assigned to a single timing advance group from a set of at least two timing advance groups and may be managed by two or more timing advance processes. The RANs may use multiple timing advance processes in LTE that supports multiple (e.g., five) groups of RANs. Moreover, the RANs may be disjoint in one or more parameters and may provide independent estimates of propagation delay. The RANs may be disjoint by virtue of having multiple geographic locations, operational frequency bands, subcarrier spacings, channel bandwidths, antenna orientations, antenna beamwidths, degrees of line of sight propagation, degrees of non-line of sight propagation, and/or the like. In some implementations, the parameters of the RANs may be configured to be disjoint to utilize an independence of resultant delay estimates. Some systems may implement beamforming and a UE may be able to receive two separate beams originating from a same transmitter. Such beams, even if co-located, may have marginally different timing advance, especially if on different bands and subcarrier spacings, different beamwidth capability, and/or the like, and thus may provide independent estimates of propagation delay. In some implementations beam patterns may be configured to cause independent estimates of propagation delay.

In some implementations, the monitoring system may utilize measurements of an existing set of RANs that are simultaneously providing connectivity to a UE. Alternatively, in response to a need to estimate a geolocation, or to provide a higher accuracy geolocation estimate, a UE may be configured with a set of additional RANs that provide connectivity to the UE, such that a set of one or more independent delay estimates may be determined. In some implementations, the monitoring system may utilize two or more contemporaneous measurements of timing advance.

A communication system may employ a synchronous operational mode, where all RANs are maintained within a specified limit of timing alignment. Alternatively, the communication system may employ an asynchronous mode where there is no fixed timing arrangement between the RANs, so the communication system may establish timing offsets, including any timing drift between the RANs, as a separate step to determining propagation timing delays between the UEs and the multiple RANs. For example, a global positioning system (GPS) receiver may be installed at each RAN. A magnitude of an offset between a reference clock time of each RAN and a GPS time may be measured and monitored so that the clock time of each RAN may be corrected to a common time reference.

In this way, the monitoring system autonomously scales resolution and aggregation levels of data collected from a network and utilized to determine an action. For example, the monitoring system may perform an action that optimizes network performance, a user experience, an application performance, and/or the like, which conserves computing resources, networking resources, and/or the like that would otherwise have been consumed utilizing a sub-optimal network, handling connectivity issues, utilizing sub-optimal applications, handling user complaints associated with the user experience, and/or the like.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
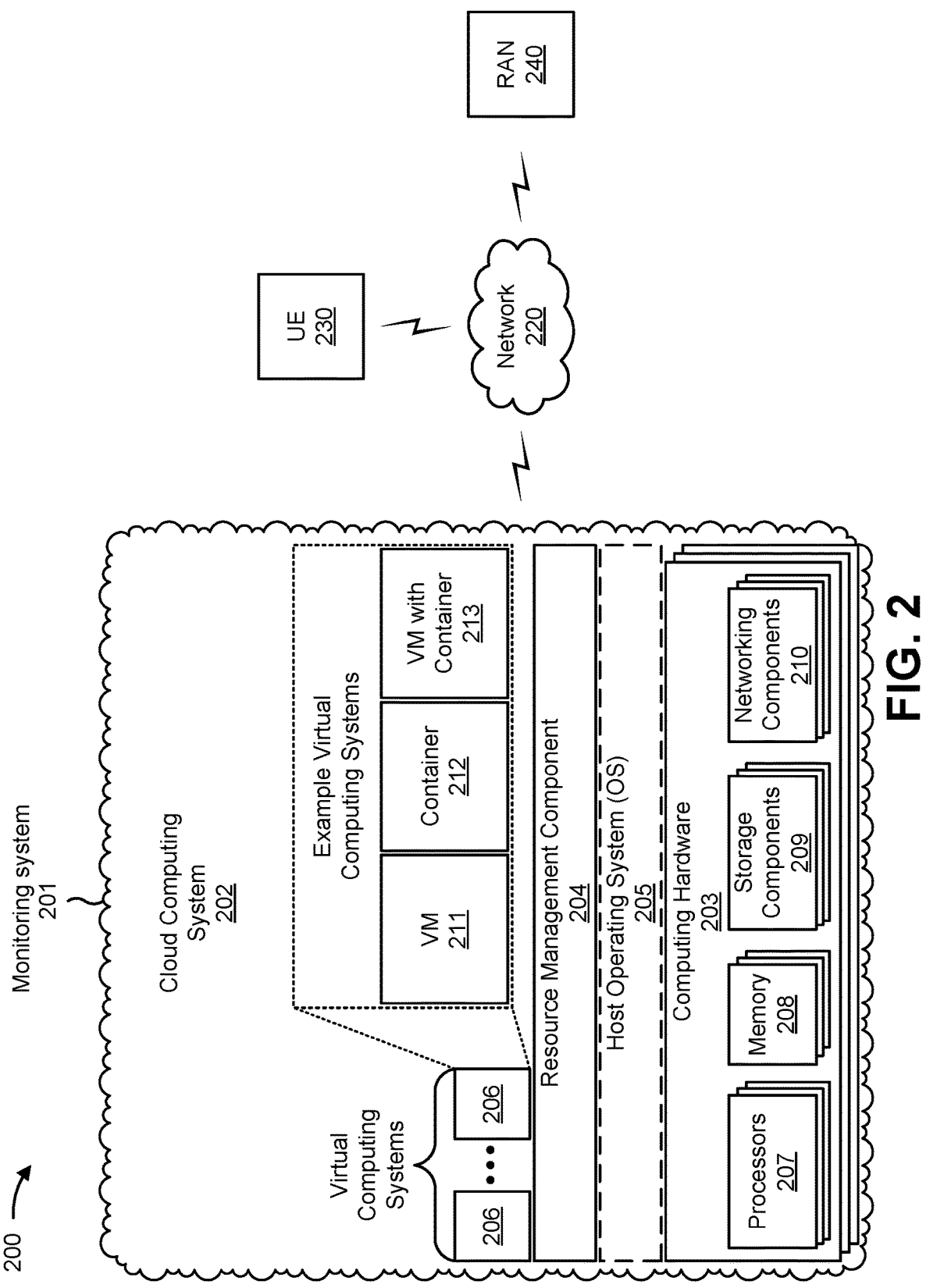
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a monitoring system 201, which may include one or more elements of and/or may execute within a cloud computing system 202. The cloud computing system 202 may include one or more elements 203-213, as described in more detail below. As further shown in FIG. 2, environment 200 may include a network 220, a UE 230, and/or a RAN 240. Devices and/or elements of environment 200 may interconnect via wired connections and/or wireless connections.

The cloud computing system 202 includes computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

Computing hardware 203 includes hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using computing hardware 203. As shown, a virtual computing system 206 may include a virtual machine 211, a container 212, or a hybrid environment 213 that includes a virtual machine and a container, among other examples. A virtual computing system 206 may execute one or more applications using a file system that includes binary files, software libraries, and/or other resources required to execute applications on a guest operating system (e.g., within the virtual computing system 206) or the host operating system 205.

Although the monitoring system 201 may include one or more elements 203-213 of the cloud computing system 202, may execute within the cloud computing system 202, and/or may be hosted within the cloud computing system 202, in some implementations, the monitoring system 201 may not be cloud-based (e.g., may be implemented outside of a cloud computing system) or may be partially cloud-based. For example, the monitoring system 201 may include one or more devices that are not part of the cloud computing system 202, such as device 300 of FIG. 3, which may include a standalone server or another type of computing device. The monitoring system 201 may perform one or more operations and/or processes described in more detail elsewhere herein.

The network 220 includes one or more wired and/or wireless networks. For example, the network 220 may include a cellular network, a public land mobile network (PLMN), a local area network (LAN), a wide area network (WAN), a private network, the Internet, and/or a combination of these or other types of networks. The network 220 enables communication among the devices of environment 200. In some implementations, the network 220 may include an example architecture of a fifth generation (5G) next generation (NG) core network included in a 5G wireless telecommunications system, a fourth generation (4G) core network included in a 4G wireless telecommunications system, and/or the like.

The UE 230 includes one or more devices capable of receiving, generating, storing, processing, and/or providing information, such as information described herein. For example, the UE 230 can include a mobile phone (e.g., a smart phone or a radiotelephone), a laptop computer, a tablet computer, a desktop computer, a handheld computer, a gaming device, a wearable communication device (e.g., a smart wristwatch, a pair of smart glasses, a head mounted display, or a virtual reality headset), a mobile hotspot device, a fixed wireless access device, customer premises equipment, an autonomous vehicle, or a similar type of device.

The RAN 240 may support, for example, a cellular radio access technology (RAT). The RAN 240 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, and/or similar types of devices) and other network entities that can support wireless communication for the UE 230. The RAN 240 may transfer traffic between the UE 230 (e.g., using a cellular RAT), one or more base stations (e.g., using a wireless interface or a backhaul interface, such as a wired backhaul interface), and/or the core network.

In some implementations, the RAN 240 may perform scheduling and/or resource management for the UE covered by the RAN 240 (e.g., the UE covered by a cell provided by RAN 240). In some implementations, the RAN 240 may be controlled or coordinated by a network controller, which may perform load balancing, network-level configuration, and/or other operations. The network controller may communicate with the RAN 240 via a wireless or wireline backhaul. In some implementations, the RAN 240 may include a network controller, a self-organizing network (SON) module or component, and/or a similar module or component. In other words, the RAN 240 may perform network control, scheduling, and/or network management functions (e.g., for uplink, downlink, and/or sidelink communications of the UE 230 covered by the RAN 240).

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
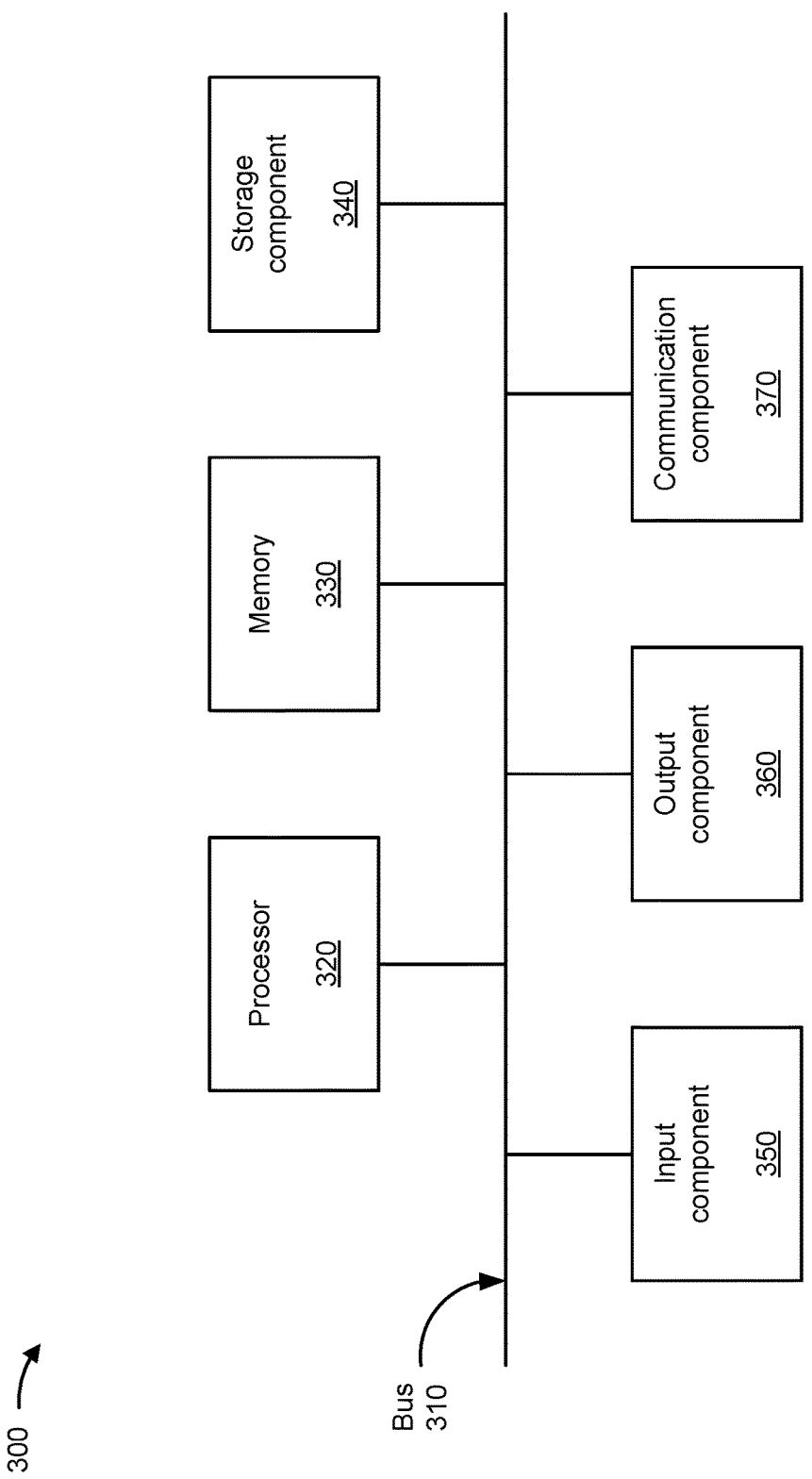
FIG. 3 is a diagram of example components of one or more devices of FIG. 2.

FIG. 3 is a diagram of example components of a device 300, which may correspond to the monitoring system 201, the UE 230, and/or the RAN 240. In some implementations, the monitoring system 201, the UE 230, and/or the RAN 240 may include one or more devices 300 and/or one or more components of device 300. As shown in FIG. 3, device 300 may include a bus 310, a processor 320, a memory 330, a storage component 340, an input component 350, an output component 360, and a communication component 370.

The bus 310 includes a component that enables wired and/or wireless communication among the components of device 300. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform a function. The memory 330 includes a random-access memory, a read only memory, and/or another type of memory (e.g., a flash memory, a magnetic memory, and/or an optical memory).

The storage component 340 stores information and/or software related to the operation of device 300. For example, the storage component 340 may include a hard disk drive, a magnetic disk drive, an optical disk drive, a solid-state disk drive, a compact disc, a digital versatile disc, and/or another type of non-transitory computer-readable medium. The input component 350 enables the device 300 to receive input, such as user input and/or sensed inputs. For example, the input component 350 may include a touch screen, a keyboard, a keypad, a mouse, a button, a microphone, a switch, a sensor, a global positioning system component, an accelerometer, a gyroscope, and/or an actuator. The output component 360 enables the device 300 to provide output, such as via a display, a speaker, and/or one or more light-emitting diodes. The communication component 370 enables the device 300 to communicate with other devices, such as via a wired connection and/or a wireless connection. For example, the communication component 370 may include a receiver, a transmitter, a transceiver, a modem, a network interface card, and/or an antenna.

The device 300 may perform one or more processes described herein. For example, a non-transitory computer-readable medium (e.g., the memory 330 and/or the storage component 340) may store a set of instructions (e.g., one or more instructions, code, software code, and/or program code) for execution by the processor 320. The processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
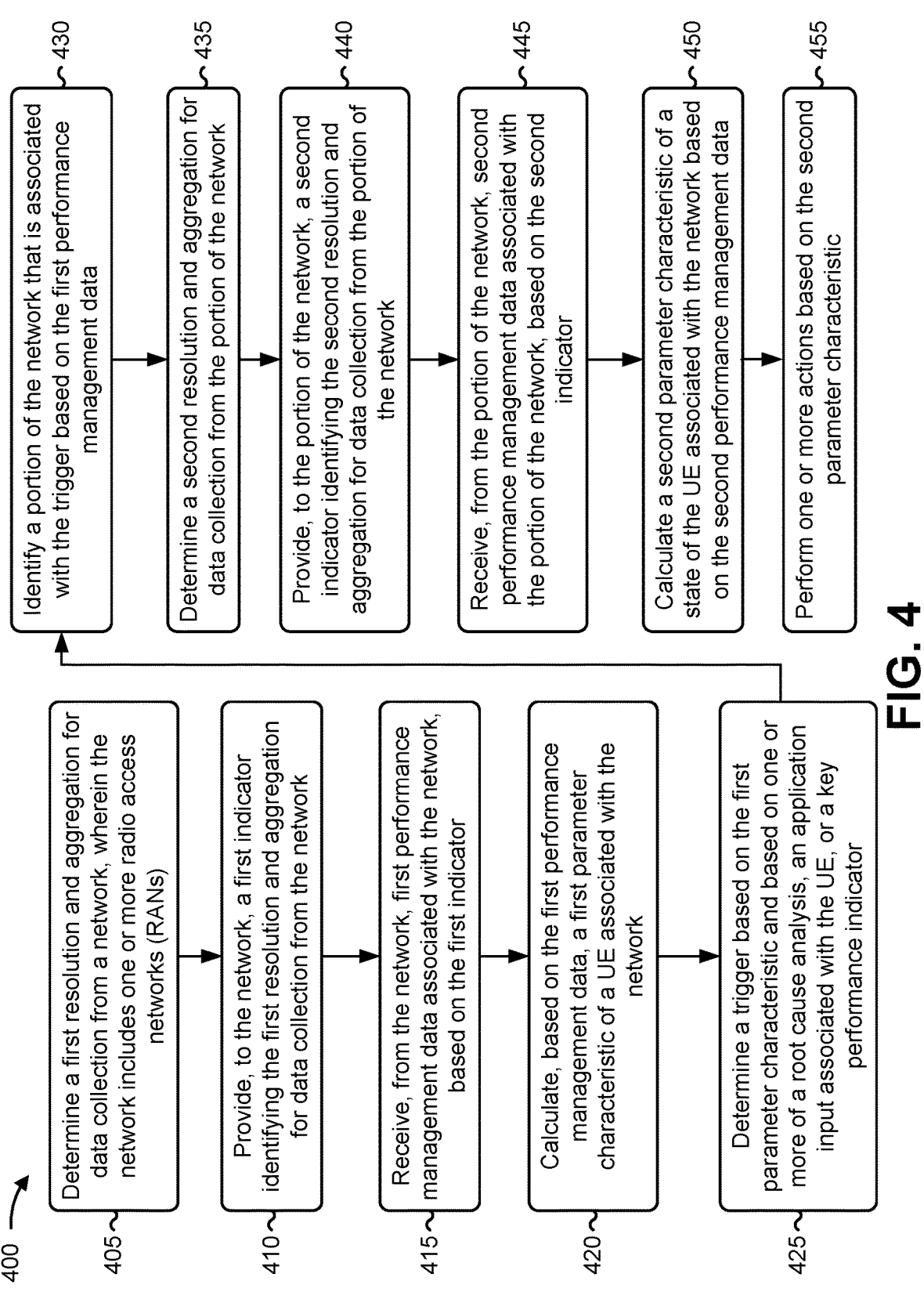
FIG. 4 is a flowchart of an example process for determining a parameter characteristic of a state of a UE via autonomous scaling of input data resolution and aggregation.

FIG. 4 is a flowchart of an example process 400 for determining a parameter characteristic of a state of a UE via autonomous scaling of input data resolution and aggregation. In some implementations, one or more process blocks of FIG. 4 may be performed by a device (e.g., the monitoring system 201). In some implementations, one or more process blocks of FIG. 4 may be performed by another device or a group of devices separate from or including the device, such as a RAN (e.g., the RAN 240). Additionally, or alternatively, one or more process blocks of FIG. 4 may be performed by one or more components of the device 300, such as the processor 320, the memory 330, the storage component 340, the input component 350, the output component 360, and/or the communication component 370.

As shown in FIG. 4, process 400 may include determining a first resolution and aggregation for data collection from a network, wherein the network includes one or more RANs and a core network (block 405). For example, the device may determine a first resolution and aggregation for data collection from a network, as described above. In some implementations, the network includes one or more RANs and a core network. In some implementations, the first resolution and aggregation includes an aggregation time for when data is collected from the network and a resolution time for when measurements are collected from the network.

As further shown in FIG. 4, process 400 may include providing, to the network, a first indicator identifying the first resolution and aggregation for data collection from the network (block 410). For example, the device may provide, to the network, a first indicator identifying the first resolution and aggregation for data collection from the network, as described above.

As further shown in FIG. 4, process 400 may include receiving, from the network, first performance management data associated with the network, based on the first indicator (block 415). For example, the device may receive, from the network, first performance management data associated with the network, based on the first indicator, as described above. In some implementations, receiving the first performance management data associated with the network, based on the first indicator, includes receiving the first performance management data at the first resolution and aggregation from the network. In some implementations, the first performance management data includes one or more of timing data associated with the network, beaming data associated with the RANs of the network, data associated with the user equipment, data collected from an operations and maintenance interface, or environmental data associated with the network.

As further shown in FIG. 4, process 400 may include calculating, based on the first performance management data, a first parameter characteristic of a state of a user equipment associated with the network (block 420). For example, the device may calculate, based on the first performance management data, a first parameter characteristic of a state of a user equipment associated with the network, as described above.

As further shown in FIG. 4, process 400 may include determining a trigger based on the first parameter characteristic and based on one or more of a root cause analysis, an application input associated with the user equipment, or a key performance indicator (block 425). For example, the device may determine a trigger based on the first parameter characteristic and based on one or more of a root cause analysis, an application input associated with the user equipment, or a key performance indicator, as described above. In some implementations, the key performance indicator includes a key performance indicator identifying one or more of an error rate associated with a RAN serving the user equipment, a throughput associated with a RAN serving the user equipment, a quality of service associated with a RAN serving the user equipment, a quality of experience associated with a RAN serving the user equipment, a mean opinion score associated with a RAN serving the user equipment, a quantity of power utilized by the user equipment, whether the user equipment reached a maximum power, a connection drop associated with the user equipment, a latency associated with a RAN serving the user equipment, jitter associated with a RAN serving the user equipment, a cell load associated with a RAN serving the user equipment, or a velocity associated with the user equipment.

As further shown in FIG. 4, process 400 may include identifying a portion of the network that is associated with the trigger based on the first performance management data (block 430). For example, the device may identify a portion of the network that is associated with the trigger based on the first performance management data, as described above.

As further shown in FIG. 4, process 400 may include determining a second resolution and aggregation for data collection from the portion of the network (block 435). For example, the device may determine a second resolution and aggregation for data collection from the portion of the network, as described above. In some implementations, the first resolution and aggregation data collection are different than the second resolution and aggregation data collection. In some implementations, the second resolution and aggregation includes an aggregation time for when data is collected from the portion of the network and a resolution time for when measurements are collected from the portion of the network. In some implementations, the second resolution and aggregation data collection is faster than and includes a greater resolution than the first resolution and aggregation data collection.

As further shown in FIG. 4, process 400 may include providing, to the portion of the network, a second indicator identifying the second resolution and aggregation for data collection from the portion of the network (block 440). For example, the device may provide, to the portion of the network, a second indicator identifying the second resolution and aggregation for data collection from the portion of the network, as described above.

As further shown in FIG. 4, process 400 may include receiving, from the portion of the network, second performance management data associated with the portion of the network, based on the second indicator (block 445). For example, the device may receive, from the portion of the network, second performance management data associated with the portion of the network, based on the second indicator, as described above. In some implementations, receiving the second performance management data associated with the portion of the network, based on the second indicator, includes receiving the second performance management data at the second resolution and aggregation from the portion of the network. In some implementations, the second performance management data includes one or more of timing data associated with the portion of the network, beam data associated with RANs of the portion of the network, data associated with the user equipment, data collected from a wireless emergency service protocol interface, or environmental data associated with the portion of the network.

In some implementations, each of the first performance management data and the second performance management data includes data identifying one or more of an angle of arrival of a RAN signal in azimuth or elevation at the user equipment, a time to determine the angle of arrival or an inability to determine the angle of arrival, a raw time of arrival of the RAN signal, a timing advance associated with the user equipment, a quantity of beam changes by the user equipment, or a quantity of beam failure recoveries by the user equipment.

As further shown in FIG. 4, process 400 may include calculating a second parameter characteristic of a state of the user equipment associated with the network based on the second performance management data (block 450). For example, the device may calculate a second parameter characteristic of a state of the user equipment associated with the network based on the second performance management data, as described above.

As further shown in FIG. 4, process 400 may include performing one or more actions based on the second parameter characteristic (block 455). For example, the device may perform one or more actions based on the second parameter characteristic, as described above. In some implementations, performing the one or more actions includes one or more of causing a higher resolution faster available data feed to be provided by the portion of the network, generating and providing for display a two-dimensional map or a three-dimensional map of the second performance management data, or causing a parameter of a RAN, of the portion of the network, to be modified. In some implementations, performing the one or more actions includes one or more of causing, in the portion of the network, a change in a location of processing the second performance management data, causing an emergency service to be provided via switching from unicast operation to multicast operation in the portion of the network, or causing an emergency service to be provided via dispatching an autonomous vehicle with network coverage to the portion of the network.

Process 400 may include additional implementations, such as any single implementation or any combination of implementations described below and/or in connection with one or more other processes described elsewhere herein.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    determining, by a device, a first resolution and aggregation for data collection from a network,
        wherein the network includes one or more radio access networks (RANs) and a core network, and
        wherein the first resolution and aggregation for data collection from the network includes a first aggregation time;
    providing, by the device and to the network, a first indicator identifying the first resolution and aggregation for data collection from the network;
    receiving, by the device and from the network, first performance management data associated with the network, based on the first indicator;
    calculating, by the device and based on the first performance management data, a first parameter characteristic of a state of a user equipment associated with the network;

determining, by the device, a trigger based on the first parameter characteristic and based on a root cause analysis,
        wherein the root cause analysis identifies a problem associated with an accuracy of the first parameter characteristic;
    identifying, by the device, a portion of the network that is associated with the trigger based on the first performance management data;
    determining, by the device, a second resolution and aggregation for data collection from the portion of the network,
        wherein the second resolution and aggregation for data collection from the portion of the network includes a second aggregation time that is faster than the first aggregation time;
    providing, by the device and to the portion of the network, a second indicator identifying the second resolution and aggregation for data collection from the portion of the network;
    receiving, by the device and from one or more first devices of the portion of the network, second performance management data associated with the portion of the network, based on the second indicator;
    calculating, by the device, a second parameter characteristic of the state of the user equipment associated with the network based on the second performance management data; and
    performing, by the device, one or more actions based on the second parameter characteristic, wherein the one or more actions comprise:
        causing a change in a location of processing the second performance management data to one or more second devices of the portion of the network based on the second parameter characteristic,
            wherein the one or more second devices are closer to an edge of the portion of the network than the one or more first devices.

2. The method of claim 1, wherein receiving the first performance management data associated with the network, based on the first indicator, comprises:
    receiving the first performance management data at the first resolution and aggregation for data collection from the network.

3. The method of claim 1, wherein the first resolution and aggregation data collection from the network includes a resolution time for when measurements are collected from the network.

4. The method of claim 1, wherein receiving the second performance management data associated with the portion of the network, based on the second indicator, comprises:
    receiving the second performance management data at the second resolution and aggregation for data collection from the portion of the network.

5. The method of claim 1, wherein the second resolution and aggregation for data collection from the portion of the network includes a resolution time for when measurements are collected from the portion of the network.

6. The method of claim 1, wherein the second resolution and aggregation for data collection from the portion of the network includes a greater resolution than the first resolution and aggregation for data collection from the network.

7. A device, comprising:
    one or more memories; and
    one or more processors, coupled to the one or more memories, configured to:

determine a first resolution and aggregation for data collection from a network, wherein the network includes one or more radio access networks (RANs) and a core network, and wherein the first resolution and aggregation for data collection from the network includes a first aggregation time;

provide, to the network, a first indicator identifying the first resolution and aggregation for data collection from the network;

receive, from the network, first performance management data associated with the network, based on the first indicator, wherein the first performance management data is received at the first resolution and aggregation for data collection from the network;

calculate, based on the first performance management data, a first parameter characteristic of a state of a user equipment associated with the network;

determine a trigger based on the first parameter characteristic and based on a root cause analysis, wherein the root cause analysis identifies a problem associated with an accuracy of the first parameter characteristic;

identify a portion of the network that is associated with the trigger based on the first performance management data;

determine a second resolution and aggregation for data collection from the portion of the network, wherein the second resolution and aggregation for data collection from the portion of the network includes a second aggregation time that is faster than the first aggregation time;

provide, to the portion of the network, a second indicator identifying the second resolution and aggregation for data collection from the portion of the network;

receive, from one or more first devices of the portion of the network, second performance management data associated with the portion of the network, based on the second indicator, wherein the second performance management data is received at the second resolution and aggregation for data collection from the portion of the network;

calculate a second parameter characteristic of the state of the user equipment associated with the network based on the second performance management data; and perform one or more actions based on the second parameter characteristic, wherein the one or more processors, to perform the one or more actions, are configured to:

cause a change in a location of processing the second performance management data to one or more second devices of the portion of the network based on the second parameter characteristic, wherein the one or more second devices are closer to an edge of the portion of the network than the one or more first devices.

8. The device of claim 7, wherein the first performance management data includes one or more of:

timing data associated with the network, beam data associated with one or more RANs of the network, identity data associated with the user equipment, data collected from an operations and maintenance interface, or environmental data associated with the network.

9. The device of claim 7, wherein the second performance management data includes one or more of:

timing data associated with the portion of the network, beam data associated with RANs of the portion of the network, identity data associated with the user equipment, data collected from a wireless emergency service protocol interface, or environmental data associated with the portion of the network.

10. The device of claim 7, wherein the one or more processors, to perform the one or more actions, are further configured to one or more of:

cause a beam intensity and a beam angle associated with a RAN, of the portion of the network, to be modified based on the second parameter characteristic;

generate and provide for display a two-dimensional map or a three-dimensional map of the second performance management data; or cause a higher resolution faster available data feed to be provided by the portion of the network.

11. The device of claim 7, wherein the one or more processors, to perform the one or more actions, are further configured to one or more of:

cause an emergency service to be provided via switching from unicast operation to multicast operation in the portion of the network; or cause an emergency service to be provided via dispatch of an autonomous vehicle with network coverage to the portion of the network.

12. The device of claim 7, wherein each of the first performance management data and the second performance management data includes data identifying one or more of:

an angle of arrival of a RAN signal in azimuth or elevation at the user equipment, a time to determine the angle of arrival or an inability to determine the angle of arrival, a raw time of arrival of the RAN signal, a timing advance associated with the user equipment, a quantity of beam changes by the user equipment, or a quantity of beam failure recoveries by the user equipment.

13. The device of claim 7, wherein the one or more processors, to determine the trigger, are configured to:

determine the trigger based on a key performance indicator, wherein the key performance indicator identifies one or more of:

an error rate associated with a RAN serving the user equipment, a throughput associated with a RAN serving the user equipment, a quality of service associated with a RAN serving the user equipment, a quality of experience associated with a RAN serving the user equipment, a mean opinion score associated with a RAN serving the user equipment, a quantity of power utilized by the user equipment, whether the user equipment reached a maximum power, a connection drop associated with the user equipment, a latency associated with a RAN serving the user equipment, jitter associated with a RAN serving the user equipment, a cell load associated with a RAN serving the user equipment, or a velocity associated with the user equipment.

14. A non-transitory computer-readable medium storing a set of instructions, the set of instructions comprising:

one or more instructions that, when executed by one or more processors of a device, cause the device to:

determine a first resolution and aggregation for data collection from a network, wherein the network includes one or more radio access networks (RANs) and a core network, and wherein the first resolution and aggregation for data collection from the network includes a first aggregation time;

receive, from the network, first performance management data associated with the network, at the first resolution and aggregation;

calculate, based on the first performance management data, a first parameter characteristic of a state of a user equipment associated with the network;

determine a trigger based on the first parameter characteristic and based on a root cause analysis, wherein the root cause analysis identifies a problem associated with an accuracy of the first parameter characteristic;

identify a portion of the network that is associated with the trigger based on the first performance management data;

determine a second resolution and aggregation for data collection from the portion of the network, wherein the second resolution and aggregation for data collection from the portion of the network includes a second aggregation time that is faster than the first aggregation time;

receive, from one or more first devices of the portion of the network, second performance management data associated with the portion of the network, at the second resolution and aggregation;

calculate a second parameter characteristic of the state of the user equipment associated with the network based on the second performance management data; and perform one or more actions based on the second parameter characteristic, wherein the one or more instructions, that cause the device to perform the one or more actions, cause the device to:

cause a change in a location of processing the second performance management data to one or more second devices of the portion of the network based on the second parameter characteristic, wherein the one or more second devices are closer to an edge of the portion of the network than the one or more first devices.

15. The non-transitory computer-readable medium of claim 14, wherein the first resolution and aggregation includes a first resolution time for when measurements are collected from the network, and wherein the second resolution and aggregation includes a second resolution time for when measurements are collected from the portion of the network.

16. The non-transitory computer-readable medium of claim 14, wherein the second resolution and aggregation includes a greater resolution than the first resolution and aggregation.

17. The non-transitory computer-readable medium of claim 14, wherein the one or more instructions, that cause the device to perform the one or more actions, further cause the device to one or more of:

cause a beam intensity and a beam angle associated with a RAN, of the portion of the network, to be modified based on the second parameter characteristic, or generate and provide for display a two-dimensional map or a three-dimensional map of the second performance management data.

18. The non-transitory computer-readable medium of claim 14, wherein the one or more instructions, that cause the device to perform the one or more actions, further cause the device to one or more of:

cause a higher resolution faster available data feed to be provided by the portion of the network;

cause an emergency service to be provided via switching from unicast operation to multicast operation in the portion of the network; or cause an emergency service to be provided via dispatch of an autonomous vehicle with network coverage to the portion of the network.

19. The method of claim 1, wherein the first parameter characteristic is a geolocation of the user equipment.

20. The method of claim 1, wherein the one or more actions comprise one or more of:

causing a beam intensity and a beam angle associated with a RAN, of the portion of the network, to be modified based on the second parameter characteristic;

generating and providing for display a two-dimensional map or a three-dimensional map of the second performance management data;

causing a higher resolution faster available data feed to be provided by the portion of the network;

causing an emergency service to be provided via switching from unicast operation to multicast operation in the portion of the network; or causing an emergency service to be provided via dispatch of an autonomous vehicle with network coverage to the portion of the network.

* * * * *